Patented June 10, 1952

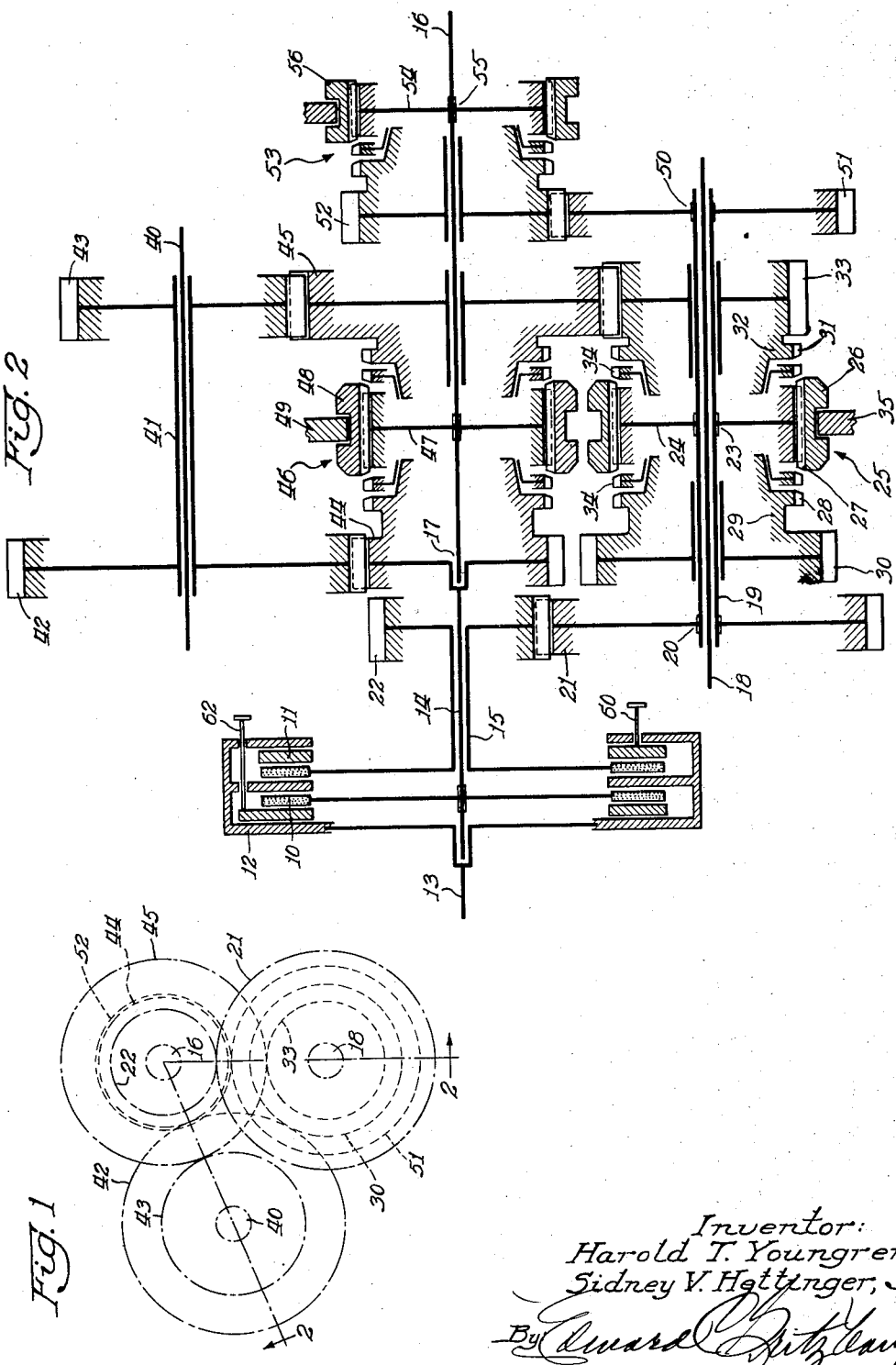

2,599,801

UNITED STATES PATENT OFFICE 2,599,801

DOUBLE COUNTERSHAFT TRANSMISSION

Harold T. Youngren, Birmingham, Mich., and Sidney V. Hettinger, Jr., Westchester, Ill., assignors to Borg-Warner Corporation, Chicago, Ill., a corporation of Illinois Application June 11, 1949, Serial No. 98,592

6 Claims. (Cl. 74—330)

The present invention relates to transmissions designed for use in connection with automotive vehicles, and more particularly to a type of transmission in which the changes in gear ratio are provided by mechanisms having individual friction clutches which are selectively operable to produce the various gear ratios.

Reference is hereby made to, and cognizance should be taken of, our copending applications for patents, Serial Nos. 98,591 and 98,593, both filed June 11, 1949, which disclose subject matter similar to that disclosed herein.

It is among the principal objects of the invention to provide a means for operating a transmission in which an uninterrupted flow of power from the engine is applied through the transmission during speed changes, thus giving a faster and smoother pick-up, as well as requiring less time to get the vehicle up to the desired speed.

Conversely, it is an object of the invention to provide a transmission which operates during deceleration of the vehicle through the various gear ratios to likewise maintain a continuous operative driving connection between the vehicle engine and the propelling means for the vehicle, thus rendering such deceleration more uniform, while at the same time preventing the vehicle from getting out of engine control.

A further object of the invention is to provide a transmission particularly adaptable for use in automotive vehicles in which the various gear ratios between the engine and the rear or drive axle are controlled by individual clutches which cause the engine power to be diverted through the proper power trains to obtain the desired gear ratio.

In carrying out the above-mentioned objects, specifically the invention contemplates the provision of a transmission having two friction clutches and five positive clutches in which four of the five positive clutches are selectively capable of being connected in series with one of the friction clutches for completing first, third and reverse power train drives through the transmission and in which two of the positive clutches are selectively capable of being connected in series with the other friction clutch to complete second and fourth power train drives through the transmission. The use of the five positive clutches in combination with the two friction clutches has been resorted to in this instance to obviate the necessity of employing shiftable gears for completing any of the various power trains. Additionally, because certain of the five positive clutches are common to both of the friction clutches, i. e. they are selectively capable of use with either friction clutch, elimination of a large number of gears which, in the absence of one or more of the friction clutches, ordinarily would be required, has been resorted to.

The first power train includes a positive clutch and a friction clutch connected in series. The second power train includes a second friction clutch and a second positive clutch. The third power train includes the first friction clutch and a third positive clutch. The fourth power train includes the second friction clutch and a fourth positive clutch. The fifth or reverse power train includes the first friction clutch and a fifth positive clutch. Still more specifically, it is contemplated that certain of the power trains shall include two of the positive clutches in a series arrangement with one of the friction clutches and, in this manner, it is possible to eliminate from the transmission a large amount of needless gearing.

The various positive clutches preferably include synchronizing mechanisms which operate to bring one rotating member up to the rotative speed of another before effecting a connection between them, thus completing the connection without objectionable clashing of gears. The automatic means for operating the various friction and positive clutches as well as the specific nature of the synchronizing devices form no part of this invention and no claim is made herein to any novelty associated with the same. As a consequence, the only disclosure which has been made herein of the automatic operating means and synchronizing devices has been the diagrammatic disclosure necessary to an understanding of the invention.

The provision of a transmission of the character briefly outlined above being the principal object of the invention, more specifically it is an object to provide a compact transmission unit adapted for automatic operation in which a pair of friction clutches are engaged alternately to establish driving connections through a plurality of power trains to effect four different forward speed ratios, and also to provide a means which will permit automatic alteration of the gear ratio by selectively conditioning certain of the power trains while another power train is in operation. Stated in other words, it is an object of the invention to provide a transmission of this character in which alternate operation of both friction clutches is preceded by automatic preconditioning of certain selecting devices without interruption of the power flow from the engine through the transmission preparatory to effecting a shift in gear ratio from a low speed ratio to the next higher speed ratio, and vice versa.

A still further object of the invention is to provide a transmission which includes a pair of countershaft assemblies, both of which cooperate with the main shaft assembly of the transmission and with the driven shaft thereof to selectively produce the desired gear ratios, thus resulting in a transmission structure in which the over-all length thereof may be materially shortened, and consequently providing a transmission case which is shorter and which has a more convenient shape than the shape of conventional transmission casings wherein a single countershaft assembly is employed.

Yet another object of the invention is to provide a transmission of the type employing a main shaft and a pair of countershafts in which there is no stacking of gears and other parts on the countershaft, thus resulting in a structure which is conveniently available for inspection and repair, and one which is easy to assemble.

Other objects and advantages of the invention, not at this time specifically enumerated, will become readily apparent as the nature of the invention is better understood.

In the accompanying single sheet of drawing forming a part of this specification, one embodiment of the invention has been shown. In these drawings:

Fig. 1 is a schematic end view of a transmission constructed in accordance with the principles of the present invention;

Fig. 2 is a sectional view taken substantially along the line 2—2 of Fig. 1.

The transmission shown schematically in Fig. 2 wherein five different power trains accommodate four forward speed ratios and one reverse speed ratio requires two friction clutches, namely, a forward friction clutch 10 and a rear friction clutch 11. The friction clutches 10 and 11 are associated with a flywheel assembly 12 operatively connected to the engine drive shaft 13. The friction clutches 10 and 11 are capable of being selectively actuated by suitable control mechanism (not shown) either to connect the engine driven flywheel 12 to a main shaft 14 or to a sleeve shaft 15 rotatably mounted on the main shaft 14.

The driven shaft 16 which is adapted to be operatively connected to the drive wheels of the vehicle with which the transmission is associated is piloted as at 17 within the rear end of the main shaft 14. A countershaft 18 is provided below the main shaft 14 and has rotatably mounted thereon a countershaft sleeve 19, the countershaft 18 itself being fixed to the transmission casing (not shown) and thus held stationary. The sleeve 19 has splined thereto as at 20 a gear 21 which is in constant mesh with a gear 22 formed on the sleeve shaft 15. Also splined as at 23 to the countershaft sleeve 19 and consequently rotatable therewith is a hub 24 forming part of a speed shift conditioning and synchronizing device in the form of a dual positive clutch assembly designated in its entirety at 25. A sliding shift collar 26 having internal teeth 27 is mounted on the hub 24 and is designed for selective engagement with a series of teeth 28 provided on a hub 29 forming part of a gear 30 or with a series of teeth 31 mounted on a hub 32 provided on a gear 33. The gears 30 and 33 are freely rotatable upon the sleeve shaft 19 and thus, it will be seen that when the shift collar 26 is moved to its extreme left-hand position as viewed in Fig. 2, the internal teeth 27 will engage the teeth 28 of the hub 29 and operatively connect the gear 30 to the sleeve 19. Similarly, when the shift collar 26 is moved to its extreme right-hand position so that the teeth 27 engage the teeth 31 on the hub 32, the gear 33 will be operatively connected to the sleeve 19. The positive clutch 25 also includes synchronizing mechanism in the form of a pair of floating rotative blocking members 34 having conical shaped surfaces which frictionally engage mating conical surfaces on the hubs 29 and 32 of the gears 30 and 33 respectively and prevent final shifting of the collar 26 until synchronization is effected. The synchronizing mechanism per se is of conventional design and no claim is made herein to any novelty associated therewith, its function being to gradually bring the various rotating parts which are to be selectively connected together up to the same speed of rotation prior to effecting a final shift of the collar 26. A shift fork or yoke 35 is provided for the purpose of effecting movement of the shift collar 26.

A second countershaft 40 is provided below the main shaft 14 and has rotatably mounted thereon a gear unit or cluster 41 including a large gear 42 and a small gear 43. The gear 42 is in constant mesh with a gear 44 formed on the main shaft 14 and the gear 43 is in constant mesh with a gear 45 rotatably mounted on the driven shaft 16, this latter gear 45 also being in constant mesh with the previously mentioned gear 33 which is rotatably mounted on the countershaft sleeve 19.

A second speed shift conditioning and synchronizing device in the form of a dual positive clutch assembly is designated in its entirety at 46. This synchronizing device is substantially identical with the speed shift and conditioning device 25 and has a hub 47 splined to the driven shaft 17 and the sliding collar 48 thereof serves to selectively connect either the gear 44 or the gear 45 to the driven shaft 16. A shift fork or yoke 49 controls the movement of the shift collar 48.

The countershaft sleeve 19 has splined thereto as at 50 a gear 51 which meshes with a gear 52 rotatably mounted on the driven shaft 16. A third speed shift conditioning and synchronizing device in the form of a single positive clutch assembly is designated in its entirety 53 and includes a hub 54 splined as at 55 to the driven shaft 16. A shift collar 56 mounted on the hub 54 is movable from a disengaged position to a position wherein it is in engagement with the gear 52. The speed shift conditioning and synchronizing device 53 is similar to the devices 25 and 46 and, as a consequence, further description thereof is believed to be unnecessary. It will be seen that when the shift collar 56 is moved to its extreme left-hand position, it will serve to operatively connect the gear 52 to the driven shaft 16 and that when it is in its right-hand position, the gear 52 will be disconnected from the driven shaft 16.

In the operation of the transmission as described, low or first gear is attained by engaging the clutch 11 under the control of a suitable operating rod 60 or other clutch actuating mechanism. Such engagement of the clutch 11 serves to connect the sleeve shaft 15 to the flywheel 12 and cause rotation of the gear 22 and of the gear 21 meshing therewith and mounted on the countershaft sleeve 19. The speed shift conditioning and synchronizing device 25 has its shift collar shifted to the right as viewed in Fig. 2 so as to connect the gear 33 to the countershaft sleeve 19 while the shift collar 48 of the speed shift conditioning device 46 is moved to the right so as to connect the gear 45 to the driven shaft 16. The speed shift conditioning devices 25 and 46 may be actuated manually prior to engagement of the clutch 12 for shifting the transmission into first or low speed, but in general it is contemplated that such preconditioning of these devices shall take place automatically under the control of one or more factors associated with the operation of the vehicle. Such preconditioning of the devices 25 and 46 may be influenced by any one or a combination of such factors as engine speed, the speed of the vehicle, the position of the vehicle accelerator pedal, the degree of vacuum in the intake manifold of the vehicle engine, the viscosity of the oil in the transmission housing, or any combination of these phenomena. The present invention is not concerned with the specific means by which the devices 25 and 46 are preconditioned preparatory to effecting a final shift in speed ratio, and it is deemed sufficient to state that, prior to any particular change in speed ratio, the desired preconditioning of the devices 25 and 46 will have automatically been effected.

With the clutch 11 engaged and the gear 33 operatively connected to the countershaft sleeve 19 by virtue of the shift collar 26 being in its righthand position as shown in Fig. 2, and the gear 45 operatively connected to the driven shaft 16 by virtue of the shift collar 45 being in its right-hand position, a drive exists from the flywheel 12 through the clutch 11, sleeve shaft 15, gears 22, 21, countershaft sleeve 19, hub 24 of the synchronizing device 25, shift collar 26, gears 33, 45, shift collar 48 of the speed shift conditioning and synchronizing device 46 and hub 47 to the driven shaft 16, thus establishing a low gear ratio drive from the driving shaft 13 to the driven shaft 16.

The shift from first or low gear into second gear is attained merely by engagement of the friction clutch 10 and disengagement of the friction clutch 11 with the speed shift conditioning and synchronizing devices 25 and 46 remaining undisturbed and in the position which they assume in low speed driving ratio. With the friction clutch 10 engaged under the influence of a suitable control mechanism 62 which may be manual or automatic, as desired, a drive exists from the flywheel 12 through the friction clutch 10, main shaft 14, gears 44, 42 and gears 43, 45, shift collar 48 of the speed shift conditioning and synchronizing device 46 and hub 47 to the driven shaft 16.

Prior to shifting from second speed gear ratio into third speed gear ratio, and while an actual drive exists through the second speed gear ratio power train, the speed ratio conditioning and synchronizing device 53 and the speed ratio conditioning and synchronizing device 25 are preconditioned by moving the shift collar 56 to its extreme left-hand position as viewed in Fig. 2 and by moving the shift collar 26 to the left to a neutral position while the speed ratio conditioning and synchronizing device 46 remains substantially the same with the shift collar 48 thereof in its right-hand position. The friction clutch 10 is disengaged and the friction clutch 11 re-engaged so that a drive exists from the flywheel 12 through the friction clutch 11, sleeve shaft 15, gears 22, 21, countershaft sleeve 19, gears 51 and 52, shift collar 56 and hub 54 to the driven shaft 16.

A direct drive condition of the transmission which is the fourth forward gear ratio thereof is attained by preconditioning the speed ratio conditioning and synchronizing device 46 so that the shift collar 48 thereof assumes its extreme left-hand position as viewed in Fig. 2 while an actual drive exists through the third speed gear ratio power train. The forward friction clutch 10 is then re-engaged and the rear friction clutch 11 disengaged and a drive then exists from the flywheel 12 through the friction clutch 10, main shaft 14, gear 44, shift collar 48 and hub 47 to the driven shaft 16. It is obvious that when this power train just described is in effect, a direct drive exists from the engine shaft 13 to the driven shaft 16 and a one-to-one gear ratio of the transmission obtains.

If a downshift from fourth gear ratio to third gear ratio is in order, re-engagement of the friction clutch 10 and disengagement of the friction clutch 11 reestablishes the previously described third speed gear ratio power train.

Thereafter, successive downshift operations or upshift operations will take place upon disengagement of the friction clutch 11 and engagement of the friction clutch 10 or vice versa, such operations being preceded by the necessary shift of one or more of the positive clutch-controlling collars 26, 48, or 56, as the case may be, to precondition or potentially establish, for subsequent transmission of torque therethrough for driving purposes, the desired power train prior to disengagement of the preceding power train.

In each case the desired upshift or downshift will be in the form of a power shift without the interruption of the application of torque to the driven shaft from the driving shaft in the case of an upshift or reverse torque in the opposite direction in the case of a downshift.

Reverse drive is attained by manual preconditioning of the various synchronizing and speed ratio conditioning devices to place the collars 48 and 56 in their right-hand positions as viewed in Fig. 2 and to place the collar 26 in its lefthand position. The front friction clutch 10 is then engaged so that a drive exists from the flywheel 12 through the clutch 10, main driving shaft 14, gears 22, 21, counter-shaft sleeve 19, hub 24 of the synchronizing and conditioning device 25, gears 30 and 42, gears 43 and 45, clutch collar 48 and hub 47 to the driven shaft 16 which is rotated in a reverse direction.

From the above description of the operation of the transmission, it will be seen that all of the gear shift operations during acceleration of the vehicle from a standstill to direct drive gear ratio are obtained by alternate engagement and disengagement of the two friction clutches 10 and 11. It will be understood that the preconditioning of the devices 25, 46 and 53 will take place automatically under the control of operating conditions associated with the vehicle as previously outlined above. Thus, each change in speed ratio during acceleration of the vehicle is conducted by a power shift operation, which is to say that an uninterrupted flow of power during acceleration of the vehicle throughout the various speed ratio changes is maintained. As a consequence, there is practically no loss of time from the operation of changing gear ratios as is at present consumed in the standard type of transmission and, since the synchronizing devices 25, 46 and 53 are employed, clashing of gears is substantially eliminated. The net effect of the use of a transmission such as has been described in detail above is to provide a substantially effortless means whereby the vehicle may be brought up to a desired speed in less time than is ordinarily consumed with transmissions of conventional design. It will, of course, be appreciated that the same conditions of alternate engagement and disengagement of the two clutches 10 and 11 obtain during down shifting operations with preconditioning of the speed shift and synchronizing devices 25, 46 and 53 taking place automatically.

While I have described my invention in connection with one specific embodiment thereof, it is to be understood that this is by way of illustration and not by way of limitation and the scope of my invention is defined solely by the appended claims which should be construed as broadly as the prior art will permit.

We claim:

1. In a transmission, the combination of a drive shaft, a driven shaft, a pair of countershafts, means for providing a low speed power train between said drive and driven shafts through one of said countershafts and including a positive clutch engageable to condition the transmission for the low speed power train and a friction clutch connected in series with the positive clutch and engageable to complete the low speed power train, means for providing a relatively higher speed power train between said drive and driven shafts through the other of said countershafts and including a second positive clutch engageable to condition the transmission for the relatively higher speed power train and a second friction clutch connected in series with the second positive clutch and engageable to complete the relatively higher speed power train, means for providing a still higher speed power train between said drive and driven shafts through said one countershaft and including a third positive clutch engageable to condition the transmission for the still higher speed power train and the first friction clutch connected in series with the third positive clutch and engageable to complete the still higher speed power train, means for providing a direct drive between said drive and driven shafts and including a fourth positive clutch engageable to condition the transmission for the direct drive and the second friction clutch connected in series with the fourth positive clutch and engageable to complete the direct drive, and means for providing a reverse drive power train between said drive and driven shafts through both of said countershafts and including a fifth positive clutch engageable to condition the transmission for the reverse drive and the first friction clutch connected in series with the fifth positive clutch and engageable to complete the reverse drive.

2. In a transmission, the combination of a drive shaft, a driven shaft, a pair of countershafts, means for providing a relatively low speed power train between said drive and driven shafts through one of the countershafts and including a first positive clutch engageable to condition the transmission for the low speed power train and a first friction clutch connected in series with the first positive clutch and engageable to complete the low speed power train, means for providing a higher speed power train between said drive and driven shafts through the other countershaft and including a second positive clutch engageable to condition the transmission for the higher speed power train and a second friction clutch connected in series with the second positive clutch and engageable to complete the high speed power train, means for providing a direct drive between said drive and driven shafts and including a third positive clutch engageable to condition the transmission for the direct drive and said first friction clutch connected in series with the third positive clutch and engageable to complete the direct drive, and means for providing a reverse drive power train between said drive and driven shafts through both of said countershafts and including a fourth positive clutch engageable to condition the transmission for the reverse drive and said second friction clutch connected in series with the fourth positive clutch and engageable to complete the reverse drive.

3. In a transmission, the combination of a drive shaft, a driven shaft, a pair of countershafts, means for providing a low speed power train between said drive and driven shafts through one of the countershafts and including a positive clutch engageable to condition the transmission for the low speed power train and a friction clutch connected in series with the positive clutch and engageable to complete the low speed power train, means for providing a higher speed power train between said drive and driven shafts through the other of the countershafts and including a second positive clutch engageable to condition the transmission for the higher speed power train and a second friction clutch connected in series with the second positive clutch and engageable to complete the higher speed power train, means for providing a direct drive power train between said drive and driven shafts and including a third positive clutch engageable to condition the transmission for the direct drive and the second friction clutch connected in series with the third positive clutch and engageable to complete the direct drive, and means for providing a reverse drive power train between said drive and driven shafts through both of said countershafts and including a fourth positive clutch engageable to condition the transmission for the reverse drive and the first friction clutch connected in series with the fourth positive clutch and engageable to complete the reverse drive.

4. In a transmission, the combination of a drive shaft, a driven shaft, a pair of countershafts, means for providing a first speed power train between said drive and driven shafts through one of said countershafts and including a positive clutch and a friction clutch connected in series, means for providing a second speed power train between said drive and driven shafts through the other of said countershafts and including a second friction clutch and a second positive clutch connected in series, means for providing a third speed power train between said drive and driven shafts through said one countershaft and including said first friction clutch and a third positive clutch connected in series, means for providing a fourth speed power train between said drive and driven shafts and including said second friction clutch and a fourth positive clutch connected in series, and means providing a reverse drive power train between said drive and driven shafts through both of said countershafts and including said first friction clutch and a fifth positive clutch connected in series, each of said positive clutches upon engagement thereof serving to potentially establish its respective power train and said power train becoming established upon engagement of its respective friction clutch, said second and fourth positive clutches being capable of engagement, each to the exclusion of the other, when said third speed power train is in effect.

5. In a transmission, the combination of a drive shaft, a driven shaft, a pair of countershafts, means for providing a relatively low speed power train between said drive and driven shafts through one of said countershafts and including a first friction clutch and a first positive clutch connected in series, means for providing a higher speed power train between said drive and driven shafts through the other of said countershafts and including a second friction clutch and a second positive clutch connected in series, means for providing a direct drive power train between said drive and driven shafts and including said first friction clutch and a third positive clutch connected in series, and means for providing a reverse drive power train between said drive and driven shafts through both of said countershafts and including said second friction clutch and a fourth positive clutch connected in series, each of said positive clutches upon engagement thereof serving to potentially establish its respective power train and said power train becoming established upon engagement of its respective friction clutch, said first and third positive clutches being capable of engagement, each to the exclusion of the other, when said second speed power train is in effect.

6. In a transmission, the combination of a drive shaft, a driven shaft, a pair of countershafts, means for providing a first speed power train between said drive and driven shafts through one of said countershafts and including a positive clutch and a friction clutch connected in series, means for providing a second speed power train between said drive and driven shafts through the other of said countershafts and including a second friction clutch and a second positive clutch connected in series, means for providing a third speed power train between said drive and driven shafts through said one countershaft and including said first friction clutch and a third positive clutch connected in series, and means providing a reverse drive power train between said drive and driven shafts through both of said countershafts and including said first friction clutch and a fourth positive clutch, each of said positive clutches upon engagement thereof serving to potentially establish its respective power train and said power train becoming established upon engagement of its respective friction clutch, said second positive clutch being capable of engagement when said third speed power train is in effect.

HAROLD T. YOUNGREN.
SIDNEY V. HETTINGER, Jr.

REFERENCES CITED

The following references are of record in the file of this patent:

UNITED STATES PATENTS

| Number | Name | Date |
| --- | --- | --- |
| 2,208,153 | Budlong | July 16, 1940 |
| 2,315,808 | Miller | Apr. 6, 1943 |
| 2,466,318 | Kohr | Apr. 5, 1949 |
| 2,485,688 | Banker | Oct. 25, 1949 |

FOREIGN PATENTS

| Number | Country | Date |
| --- | --- | --- |
| 226,366 | Switzerland | July 1, 1943 |
| 232,801 | Switzerland | Sept. 1, 1944 |
| 528,084 | France | Nov. 5, 1921 |
| 604,178 | Great Britain | June 29, 1948 |